US012768322B2

(12) United States Patent
Van Osten et al.

(10) Patent No.: US 12,768,322 B2
(45) Date of Patent: Oct. 20, 2026

(54) REPAIR BOOT FOR AN AIR INTAKE ASSEMBLY

(71) Applicant: RB Distribution, Inc., Colmar, PA (US)

(72) Inventors: Christopher Thomas Van Osten, Telford, PA (US); Sagar Kumar, Bensalem, PA (US); Marc Anthony McCann, Philadelphia, PA (US)

(73) Assignee: RB Distribution, Inc., Colmar, PA (US)

( * ) Notice: Subject to any disclaimer, the term of this patent is extended or adjusted under 35 U.S.C. 154(b) by 683 days.

(21) Appl. No.: 18/169,663

(22) Filed: Feb. 15, 2023

(65) Prior Publication Data

US 2024/0271737 A1 Aug. 15, 2024

(51) Int. Cl.

| | |
|---|---|
| ***F02M 35/10*** | (2006.01) |
| ***F16L 11/15*** | (2006.01) |
| ***F16L 23/08*** | (2006.01) |
| ***F16L 33/23*** | (2006.01) |
| ***F16L 55/16*** | (2006.01) |
| *F16L 25/00* | (2006.01) |

(52) U.S. Cl.

CPC *F02M 35/10137* (2013.01); *F02M 35/10144* (2013.01); *F16L 23/08* (2013.01); *F16L 33/23* (2013.01); *F16L 55/1608* (2013.01); *F16L 11/15* (2013.01); *F16L 25/0036* (2013.01)

(58) Field of Classification Search

CPC ....... F02M 35/10137; F02M 35/10144; F02M 35/10354; F02M 35/1283; F02M 35/0204; F02M 35/1034; F02M 35/1036; F16J 3/042; F16L 11/122; F16L 11/15; F16L 13/163; F16L 21/005; F16L 23/04; F16L 23/06; F16L 23/08; F16L 25/0036; F16L 27/11; F16L 33/00; F16L 33/08; F16L 33/085; F16L 33/12; F16L 33/2071; F16L 33/227; F16L 33/23; F16L 33/28; F16L 37/04; F16L 51/025; F16L 21/06; F16L 23/10; F16L 37/0985; F24F 13/0209; F01N 13/1816; F01N 2450/18; F16B 2200/509

USPC ....... 285/242, 252, 337, 406, 407, 408, 411, 285/364; 403/338

See application file for complete search history.

(56) References Cited

U.S. PATENT DOCUMENTS

| | | | | |
|---|---|---|---|---|
| 1,487,389 A * | 3/1924 | King | F16L 13/163 | 285/424 |
| 3,298,698 A * | 1/1967 | Condon | F16L 49/02 | 285/911 |
| 3,464,232 A * | 9/1969 | Hutchinson | F16D 3/227 | 464/146 |

(Continued)

FOREIGN PATENT DOCUMENTS

| | | | |
|---|---|---|---|
| CN | 105715883 A * | 6/2016 | F16L 11/15 |
| DE | 202016100178 U1 * | 2/2016 | F16L 37/1225 |

(Continued)

*Primary Examiner* — Kenneth Rinehart
*Assistant Examiner* — Richard K. Durden
(74) *Attorney, Agent, or Firm* — Volpe Koenig

(57) ABSTRACT

A repair boot for an air intake assembly having an air intake duct. The repair boot is open between its ends and has a collar with a first interior dimension that is selected to complement the air intake duct and a second interior diameter that is selected to engage a surrounding flange on the exterior of air intake duct.

8 Claims, 5 Drawing Sheets

(56) References Cited

U.S. PATENT DOCUMENTS 3,820,831 A * 6/1974 Swedelius ............. F16L 17/063 285/367
3,836,182 A * 9/1974 Miller ..................... F16L 23/10 285/368
4,058,330 A * 11/1977 Wolf ....................... F16L 37/05 285/423
4,835,866 A * 6/1989 Nagashima .......... F02M 35/104 123/73 AD
5,065,708 A * 11/1991 Wehle ..................... F02F 1/002 123/184.61
5,190,322 A * 3/1993 Hughes ............ F02M 35/10144 285/332
5,340,952 A * 8/1994 Takiguchi ........... F01N 13/1888 181/282
5,622,391 A * 4/1997 Belik ...................... F16L 33/08 285/23
5,769,045 A * 6/1998 Edwards .............. F02M 35/161 123/184.61
6,041,824 A * 3/2000 Powell ............. F02M 35/10347 138/155
6,547,669 B1 * 4/2003 Neviani .................. F16D 3/845 464/175
6,755,160 B2 * 6/2004 Zimmermann ......... F02F 1/002 123/65 A
6,991,270 B2 * 1/2006 Ito ....................... F16L 37/0885 285/903
9,016,731 B2 * 4/2015 Rigollet ................ F16L 23/003 285/334.5
10,859,194 B2 * 12/2020 French .................. F16L 37/098
2003/0019456 A1 * 1/2003 Ayton ............. F02M 35/10386 123/184.21
2005/0134039 A1 * 6/2005 Henrich .................. F16L 33/04 285/252
2005/0264010 A1 * 12/2005 Wagner ................... F16L 23/08 285/363
2006/0175833 A1 * 8/2006 Tenglund ................ F16L 33/28 285/365
2007/0040379 A1 * 2/2007 Clark ............... F02M 35/10144 285/321
2008/0028938 A1 * 2/2008 Li .................... F02M 35/10144 96/154
2008/0308170 A1 * 12/2008 Bock ....................... F16L 27/11 138/109
2009/0049813 A1 * 2/2009 Nobuhira ................. B62J 50/30 55/467
2011/0254268 A1 * 10/2011 Johnson .................. F16L 23/08 285/407
2012/0190290 A1 * 7/2012 Niakan ............ F02M 35/10131 454/254
2015/0059905 A1 * 3/2015 Jones .................. F01N 13/1844 138/109
2018/0045149 A1 * 2/2018 Williams ......... F02M 35/10144
2021/0071626 A1 * 3/2021 Timme ............. F02M 35/10111
2023/0021084 A1 * 1/2023 Friedriech ............... F16L 21/02

FOREIGN PATENT DOCUMENTS

EP 1731819 A2 * 12/2006 .......... F16L 37/0985
GB 2293217 A * 3/1996 ............... F16J 3/042
WO WO-2010113981 A1 * 10/2010 ............. F02M 69/32

* cited by examiner

REPAIR BOOT FOR AN AIR INTAKE ASSEMBLY

FIELD OF INVENTION

The present invention relates generally to air intake assemblies that are associated with internal combustion engines. More particularly, the invention relates to air intake assemblies that need repairs because they are experiencing leaks. Most particularly, the invention relates to air intake assemblies that need repairs because they are experiencing leaks in a flexible tube that is part of the assembly and has been affixed to an air intake tube by a variety of plastic welding techniques, or an adhesive.

BACKGROUND

Many air intake assemblies, some of which are provided by original equipment manufactures and some of which are provided by aftermarket supplies, have an air intake tube with a boot that is glued on with an adhesive or sonic welded to the air intake tube. Over time, wear factors, such as heat changes and vibrations, cause fatigue in the glue or weld securing the boot and the boot begins to leak. Because it is important to engine power and economy to control the air intake, repairs become necessary. Most commonly, these repairs require the expense of purchasing a new air intake assembly.

SUMMARY

The present invention provides an alternative to the expensive repair option of a new assembly by providing a new air intake boot that is configured to fit on the existing air intake tube and be secure against leakage.

BRIEF DESCRIPTION OF THE DRAWINGS

The invention will be more fully understood by reference to the drawings wherein.

DETAILED DESCRIPTION

Figure 1:
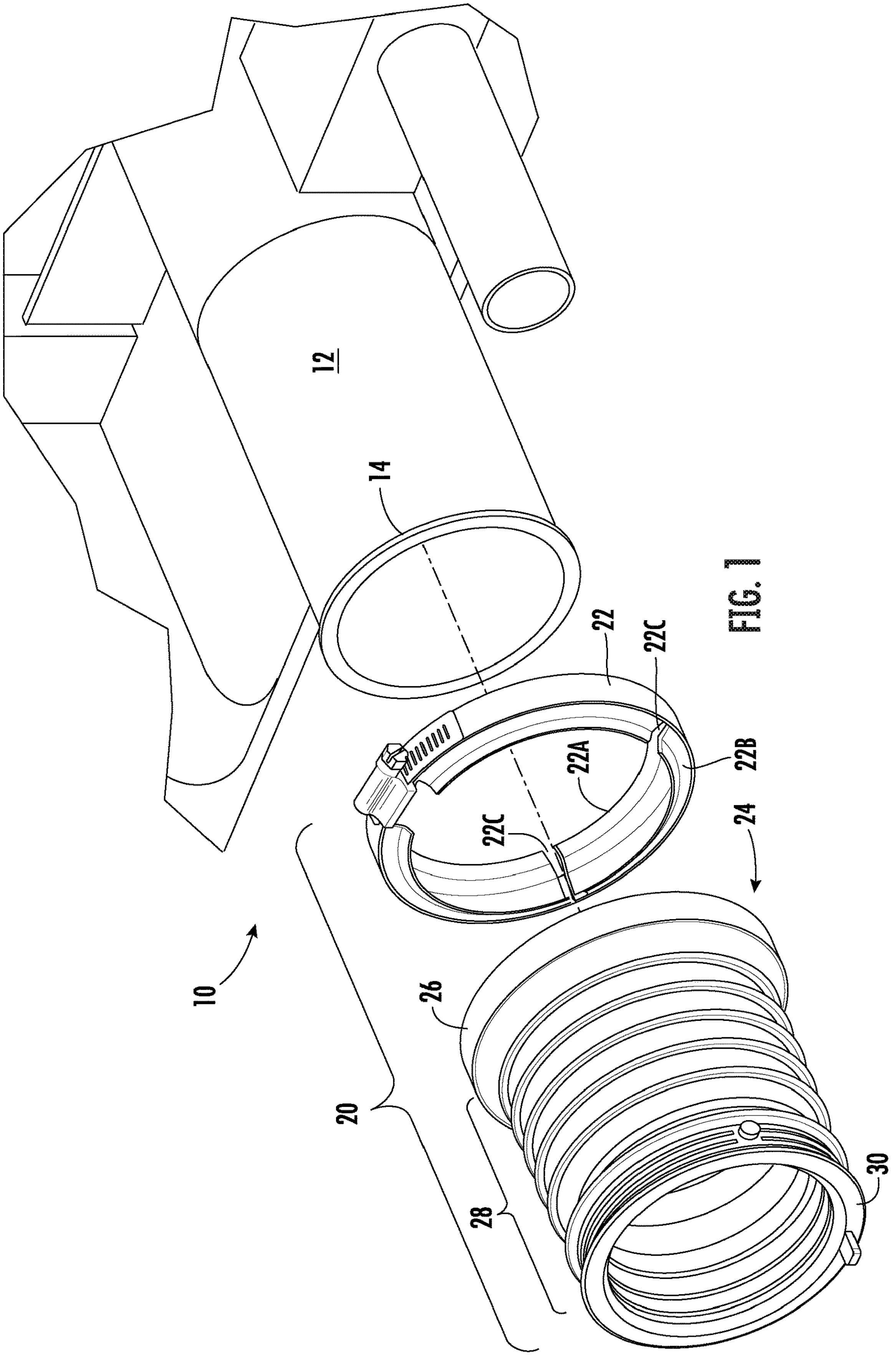
FIG. 1 illustrates the repair component in the environment of an exemplary air intake assembly.

Referring now to the drawings, FIG. 1 illustrates an exploded view of an exemplary air intake module 10 having an intake tube 12 and a circumferential flange 14 at a free end of the intake tube 12. The repair boot, generally designated as 20, includes a clamp 22, and a body 24 that has an end 26 configured to fit over the flange 14 associated with an existing air management system, an intermediate portion 28, and a free end 30 with a clamping area 32 that is configured to connect with another component of an existing air management system that incorporates the air intake module 10. The immediate portion 28 is illustrated as a flexible corrugation or billows; however, intermediate portion 28 may have a fixed shape in some application. The clamp 22 has sides 22A and 22B that fit on either side of the end 26 and reliefs 22C that facilitate uniform closing of the clamp 22.

Figure 2:
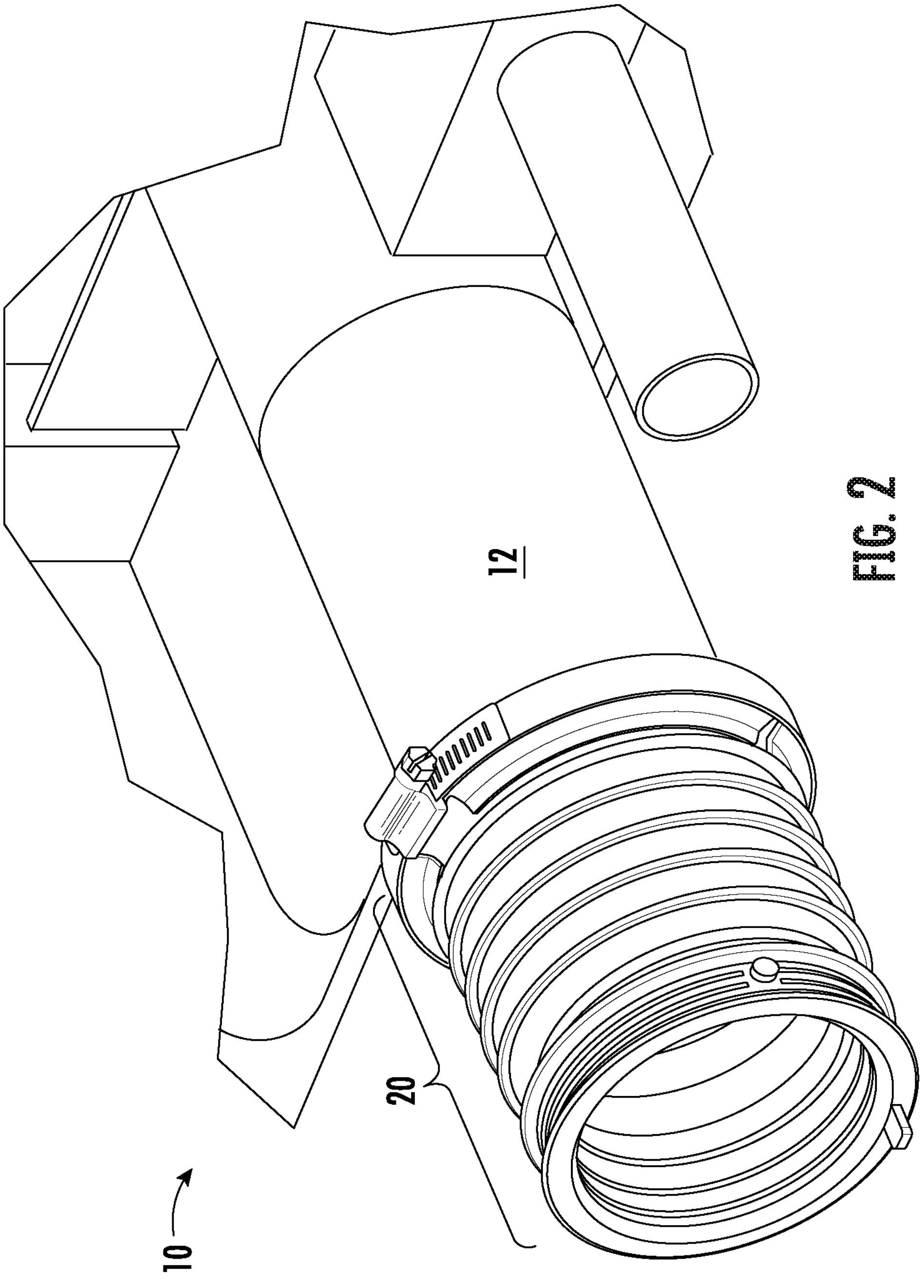
FIG. 2 illustrates the repair components assembled on an exemplary air intake assembly.
Figure 3:
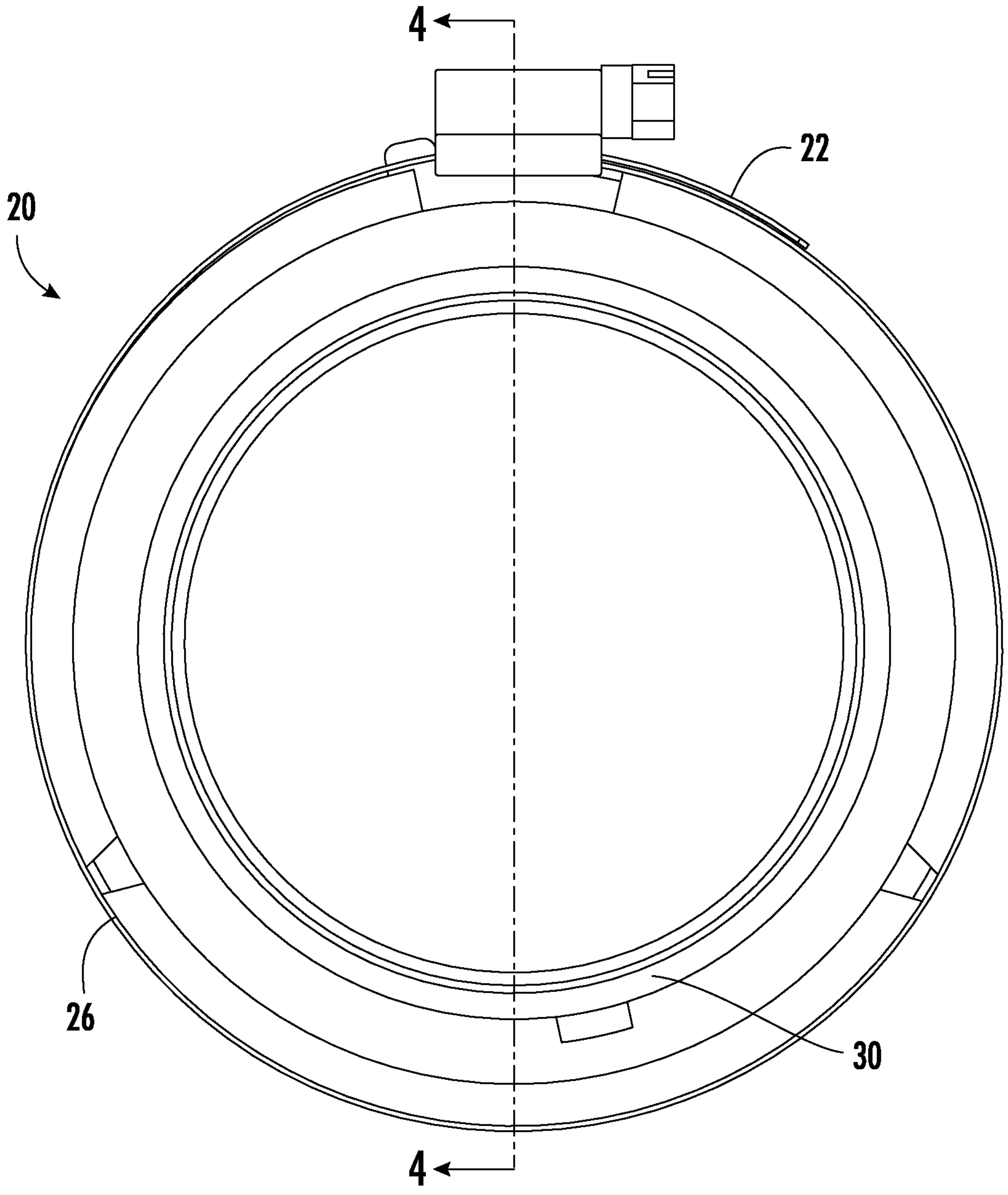
FIG. 3 is a plan view of the free end of the repair boot on the air intake tube.

FIG. 2 illustrates the repair parts in FIG. 1 assembled on the flange 14 of FIG. 1 on tube 12. FIG. 3 is a plan view of the free end 30 showing that the intermediate portion 28 in FIG. 1 has an interior diameter that compatible with the diameter of the air intake tube 12 as shown in FIG. 2. This enables the repair part to imitate the original manufacturer equipment so engine performance is not altered or hindered.

Figure 4:
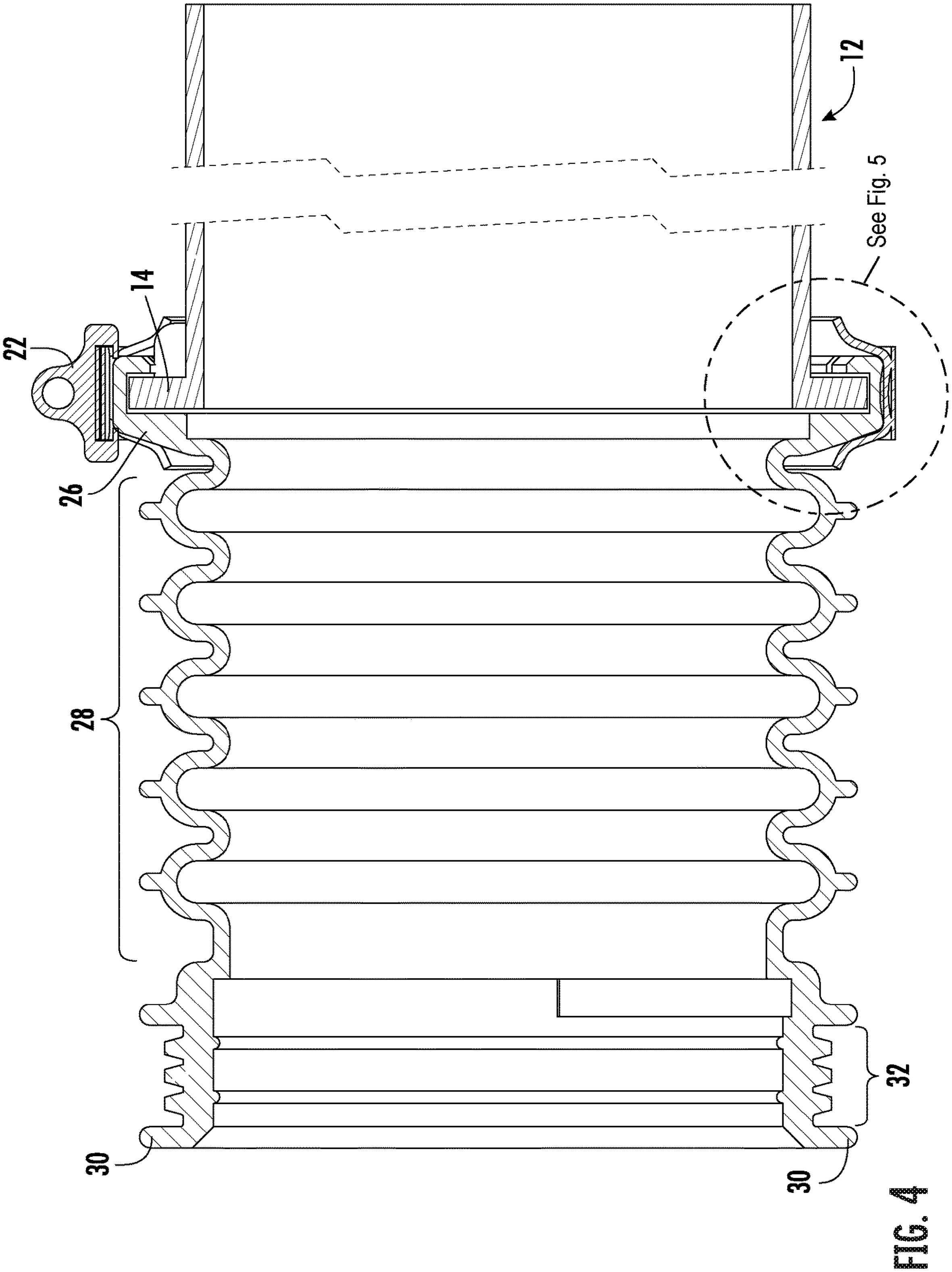
FIG. 4 is a section view along the line 4-4 in FIG. 3.
Figure 5:
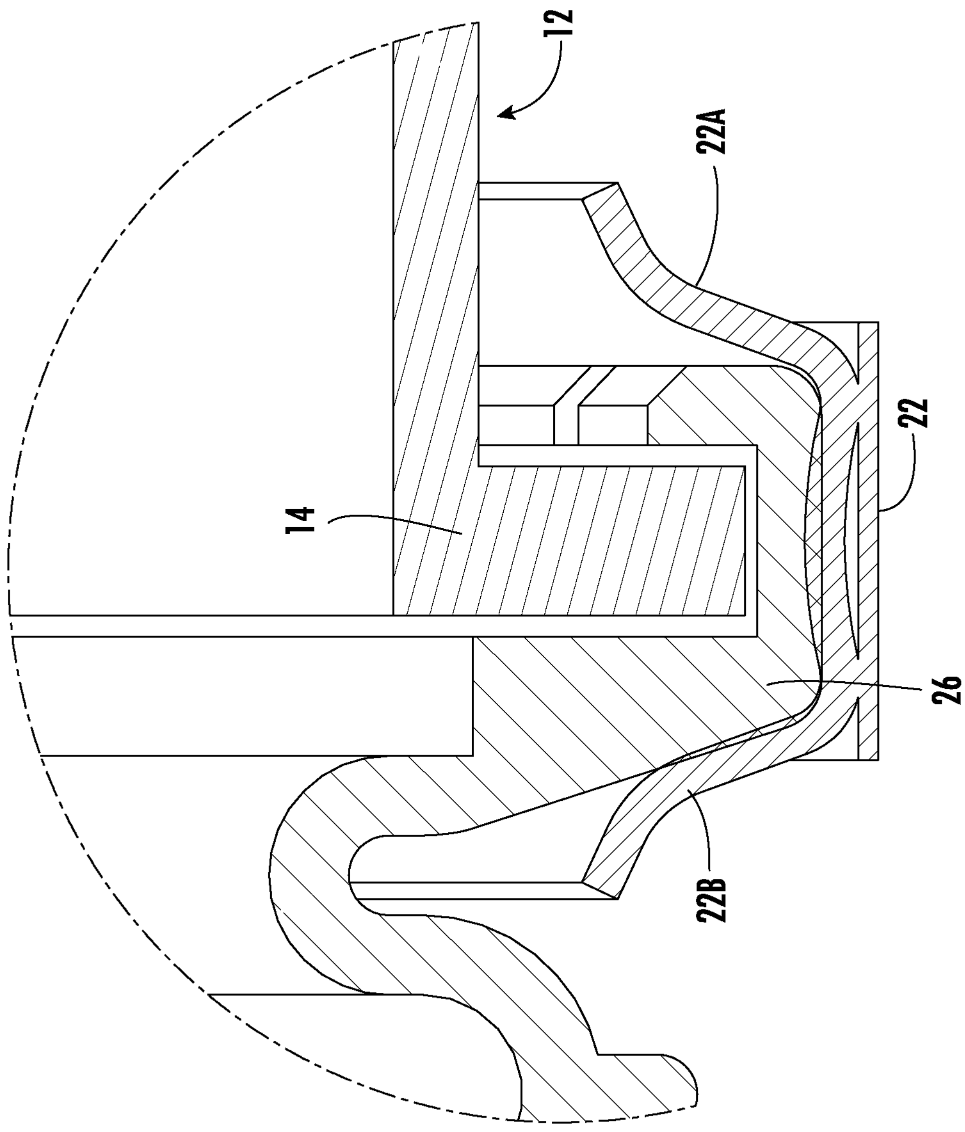
FIG. 5 is an exploded view of the encircled area 5 in FIG. 4.

FIG. 4, a section along the line 4-4 in FIG. 3, illustrates the attachment of the end 26 in FIG. 1 over the flange 14 and secured by the clamp 22, and FIG. 5 is an enlargement of that attachment. As shown in FIG. 5, the end 26 has an inverted right angle "U" shape that overlie the flange 14. The distance between the sides of the "U" are sized to receive the flange 14 and contact the intake tube 12. The clamp 22 is closed so that the end 26 is brought into contact with the free end of flange 14 and any expansion of the end 26 is confined within the sides 22A and 22B.

The intermediate portion 28, shown in FIGS. 1, 2, and 4, is formed as a flexible corrugation or bellows and is preferably made of material associated with air and fluid transport in an engine compartment that may have elevated temperatures.

In order to install the repair boot, the original boot is removed and any residual sealant or adhesive on the tube 12 or flange 14 is removed and the surface is cleaned with an appropriate solvent. The repair boot may be applied with or without an additional adhesive.

What is claimed is:

1. A repair kit for an existing air management system with an air intake assembly having an air intake duct with a free end that includes a surrounding flange, the repair kit comprising:

a repair boot having:

an open body having a portion with an inner diameter that is selected to match the air intake duct free end, a peripheral collar at a first end of the open body has a first interior dimension that is selected to overlie an outer diameter of the air intake duct and a second interior diameter that is selected to overlie the surrounding flange on the air intake duct, and a second end of the open body has a coupling portion that is configured to connect to a further component of the air management system; and, a clamp that is dimensioned to fit over an outer diameter of the peripheral collar and tighten the peripheral collar against the surrounding flange on the air intake duct, the clamp including a peripherally extending center portion that aligns with and overlies the peripheral collar and a respective peripherally extending and inwardly directed side on each axial end of the peripherally extending center portion.

2. The repair kit of claim 1, wherein the open body has a corrugated configuration.

3. The repair kit of claim 2, further comprising a second clamp for fixing the coupling portion to the further component of the existing air management system.

4. The repair kit of claim 1, wherein the peripheral collar is "U" shaped in cross-section.

5. The repair kit of claim 1, wherein the open body includes a corrugated portion, the coupling portion is a non-corrugated portion, and the repair kit further comprises a second clamp for fixing the non-corrugated portion to the further component of the existing air management system.

6. The repair kit of claim 1, wherein the coupling portion has a recess that is configured to receive a second clamp.

7. The repair kit of claim 6, further comprising a second clamp that fits within the coupling portion recess for fixing the second end to the further component of the existing air management system.

8. The repair kit of claim 1, further comprising spaced apart reliefs defined through the respective peripherally extending and inwardly directed sides of the clamp.

* * * * *